United States Patent
Riedel et al.

(10) Patent No.: US 9,623,923 B2
(45) Date of Patent: Apr. 18, 2017

(54) MODULAR LOW FLOOR TRANSPORT SYSTEM

(71) Applicant: KUKA Roboter GmbH, Augsburg (DE)

(72) Inventors: Martin Riedel, Augsburg (DE); Christoph Scheuvens, Schleiden (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/833,203

(22) Filed: Aug. 24, 2015

(65) Prior Publication Data
US 2016/0152288 A1 Jun. 2, 2016

(30) Foreign Application Priority Data
Nov. 27, 2014 (DE) .................. 10 2014 017 532

(51) Int. Cl.
| | |
|---|---|
| *B60L 11/14* | (2006.01) |
| *B62D 63/02* | (2006.01) |
| *B66F 9/06* | (2006.01) |
| *B60G 17/033* | (2006.01) |
| *B60G 99/00* | (2010.01) |
| *B60B 19/00* | (2006.01) |
| *B60B 19/12* | (2006.01) |

(52) U.S. Cl.
CPC .......... *B62D 63/025* (2013.01); *B60B 19/003* (2013.01); *B60B 19/125* (2013.01); *B60G 17/033* (2013.01); *B60G 99/002* (2013.01); *B60L 11/14* (2013.01); *B66F 9/063* (2013.01); *B60G 2300/38* (2013.01)

(58) Field of Classification Search
CPC ........ B62D 63/025; B60L 11/14; B60F 9/063; B60B 19/008; B60B 19/125; B60G 17/033
See application file for complete search history.

(56) References Cited

U.S. PATENT DOCUMENTS

| | | | | |
|---|---|---|---|---|
| 2,998,980 A | * | 9/1961 | Ulinski .................. | B60G 3/207 280/124.113 |
| 3,291,283 A | * | 12/1966 | Keith .................... | B65G 13/07 193/35 F |

FOREIGN PATENT DOCUMENTS

| | | |
|---|---|---|
| DE | 102012102648 A1 | 9/2012 |
| DE | 102013002860 A1 | 8/2014 |
| EP | 1957348 A2 | 8/2008 |

OTHER PUBLICATIONS

German Patent Office; Search Report in German Patent Application No. 10 2014 017 532.4 dated Jun. 17, 2015; 16 pages.
(Continued)

*Primary Examiner* — John Walters
*Assistant Examiner* — James Triggs
(74) *Attorney, Agent, or Firm* — Wood Herron & Evans LLP

(57) ABSTRACT

A modular low-floor transport system comprises at least one drive module and at least one carrier module. The drive module includes a drive base and a drive chassis connected to the drive base. The drive chassis includes at least one driven wheel coupled to a drive. The carrier module includes a carrier base and a carrier chassis connected to the carrier base. The carrier chassis includes at least one non-driven carrier wheel. The drive base and the carrier base are rigidly connected to each other with respect to a stroke direction, and the drive chassis is movably mounted in the stroke direction to the drive base.

23 Claims, 3 Drawing Sheets

(56) References Cited

OTHER PUBLICATIONS

German Patent Office; Examination Report in German Patent Application No. 10 2014 017 532.4 dated Jun. 17, 2015; 20 pages.

* cited by examiner

MODULAR LOW FLOOR TRANSPORT SYSTEM

CROSS-REFERENCE TO RELATED APPLICATIONS

This application claims the benefit of priority under 35 U.S.C. §119(a) to German Patent Application DE 10 2014 017 532.4, filed Nov. 27, 2014 (pending), the disclosure of which is hereby incorporated by reference in its entirety.

TECHNICAL FIELD

The present invention relates to a modular low-floor transport system having at least one drive module and at least one transport module, to a corresponding drive and/or transport module, and to a method for the assembly of such a low-floor transport system.

BACKGROUND

A vehicle system composed of a plurality of individual vehicles is known from EP 1 957 348 B1, wherein said vehicles are coupled together with vertical play, and wherein individual drive vehicles have driven Mecanum wheels, while individual transport vehicles have non-driven wheels. This configuration is intended to distribute a working load evenly to the individual vehicles.

Such an even distribution of load to the individual vehicles can disadvantageously lead to an excessive load on the individual drive vehicles, which regularly support lower maximum loads, due to the drives of the Mecanum wheels, than non-driven individual transport vehicles.

The problem addressed by the present invention is that of providing an improved modular low-floor transport system.

SUMMARY

According to one aspect of the present invention, a modular low-floor transport system has one or multiple drive modules described herein, in particular at least substantially of identical construction, each having a drive base and a drive chassis connected thereto, wherein each of these has one or multiple, in particular at least three, and preferably at least four or more, driven wheels which are each coupled to a drive.

In one embodiment, one or more, and in particular all driven wheels, each has its own, separately controllable drive. In addition or as an alternative thereto, in one embodiment, two or more driven wheels each has a shared drive, to which said wheels can in particular be coupled via one or multiple differentials. A drive can in particular have one or multiple electric motors and/or a transmission. In one embodiment, one or more of the drive modules is self-driving, wherein its/their drives can in particular be controlled centrally or decentrally, and in particular the control of one drive module can constitute a master, and the controls of the other drive modules slaves of a master/slave configuration, or a central control can control the controls of the individual drive modules.

In one embodiment, the modular low-floor transport system has one or multiple transport (carrier) modules described herein which are in particular at least substantially identical in construction, each having a transport (carrier) base and a transport (carrier) chassis connected thereto, said chassis having exactly one, or multiple, and in particular at least one or exactly two or three, non-driven transport wheels. In one embodiment, one or more of the transport modules is designed to be passive, and/or has no drive. In another embodiment, non-driven transport wheels are decoupled from drives—in particular mechanically—and/or the otherwise present drives can be separated from a power supply, and in particular are separated therefrom.

In one embodiment, one or more of the drive bases can be connected in an axially fixed and/or torque-proof manner, in particular at least substantially without play, and in particular rigidly, to one or more of the other drive bases and/or one or more of the transport bases with respect to, and/or in, the direction of lift (stroke) described below and/or one or two transverse directions which are perpendicular to the direction of lift. In particular, these bases are connected to each other in such a manner. In addition or as an alternative thereto, in one embodiment, one or more of the transport bases can be connected axially, and/or in a torque-proof manner, in particular at least substantially without play, and in particular rigidly, to one or more of the other transport bases and/or one or more of the drive bases with respect to, and/or in, the direction of lift and/or the transverse direction(s). In particular, these bases are connected to each other in such a manner. In particular, at least one drive base and at least one transport base can be connected and/or are connected to each other in such a manner.

The concept of an axially-fixed connection of two elements, in particular bases, to each other in, and/or with respect to a direction, in particular the lift direction or a transverse direction is in particular intended to mean that the elements are at least substantially free of axial play, and cannot move and/or cannot be displaced, in particular axially, relative to each other (at least) in this direction. The concept of a torque-proof connection of two elements, in particular bases, to each other in, and/or with respect to a direction, in particular the lift direction or a transverse direction, is intended to mean in particular that the elements are at least substantially free of rotational play (at least) about an axis of rotation parallel to this direction, and in particular are immobile and/or cannot rotate. Two elements, in particular bases, which can be fixed to each other, and in particular are fixed to each other, in and/or with respect to the direction of lift, can be arranged in one embodiment, at least substantially, at the same height as viewed in the lift direction, and/or next to each other (in the transverse direction) and/or in the same plane. Similarly, two elements, in particular bases, which can be fixed to each other, and in particular are fixed to each other, in and/or with respect to the direction of lift, can be arranged offset at a—at least substantially—fixed distance as viewed in the direction of lift. Accordingly, the concept of a fixed connection with respect to, and/or in a direction, in particular refers to an excluded relative motion and/or a blocked degree of freedom in this direction, and not to an offset arrangement relative to each other in this direction, such as an arrangement of one element above the other in the direction of lift.

In one embodiment, at least two of the bases have a detachable connection to each other, and have a coupling corresponding thereto. In one embodiment, the coupling is equipped for the purpose of connecting the bases to each other in an axially-fixed and/or torque-proof manner, in particular with a positive and/or friction fit, in particular in and/or with respect to the direction of lift and/or the transverse direction(s). In one particularly simple embodiment, two bases which are coupled in a detachable manner to each other by a coupling can be fixed to a connection structure or, in particular their ends which face each other may be bolted to each other with one or multiple bolts and/or engage behind each other by means of back tapers. In addition or as an alternative thereto, in one embodiment at least two of the bases have a permanent and/or long-term connection to each other, in particular a material or integral connection design.

According to one aspect of the present invention, in one or more of the drive modules, the drive chassis is mounted on the drive base in a manner allowing movement in the direction of lift noted above, in particular between a retracted position and an extended position, and/or allowing translational movement, and/or said drive base has a degree of freedom allowing translational movement in the direction of lift.

In one implementation, in one or more of these drive modules, the drive chassis is elastically supported in the direction of lift, in particular on the drive base, by a drive force element.

In one embodiment, the direction of lift creates an angle between 75 degrees and 115 degrees, and in particular —at least substantially—90 degrees, with a transport direction of the bases connected to each other, for the purpose of receiving working loads. In one embodiment, the base-fixed direction of lift is, at least substantially, vertical, and/or creates an angle between −15 degrees, and +15 degrees with the gravitational vector, in particular and at least substantially 0 degrees when the low-floor transport system and/or the drive module is unloaded and stationary on a flat horizontal contact surface.

As such, the one or more drive chassis in the implementation can yield in the direction of lift against a reaction force of the drive force element(s) when the bases connected to each other are loaded. In this way, in one embodiment, it is possible to reduce the risk of excessive loading of the drive chassis, and in particular to prevent the same. In an implementation, it is additionally possible to reduce, and in particular avoid, the risk of the driven wheels having too little contact force.

In one embodiment, the drive force element of one or multiple drive modules and/or one or multiple transport module(s) connected to the same, and in particular each connection of the transport chassis thereof to the transport base thereof, is/are designed in such a manner that, for at least one region of a compression travel of the drive chassis toward its respective drive base in the direction of lift, a contact force of this drive chassis on a shared, flat contact surface perpendicular to the direction of lift is smaller than a contact force of the respective transport chassis.

A working load of the low-floor transport system is distributed over the bases connected to each other, and is transmitted to each respective chassis via the respective connection to the same, then exerted as a contact force onto a shared contact surface. In the process, the bases connected to each other drop in the direction of lift toward the contact surface, which is herein termed 'compression', without however restricting the generality of the concept. Accordingly, a 'compression travel' in the context of the present invention indicates a reduction in the distance of the bases connected to each other from a shared contact surface in the direction of lift.

If, as sketched in FIG. 4, the low-floor transport system consists for example of a drive module, wherein the drive chassis thereof is mounted in a prismatic joint on the drive base 100 in a manner allowing movement and is supported against the same by means of a drive force element in the form of a first spring with a rigidity $C_A$, and of a transport module connected thereto, wherein the transport chassis thereof is mounted in a parallel prismatic joint on the transport base 200 in a manner allowing movement, and is supported against the same by means of a transport force element in the form of a second spring with the rigidity $C_T$, then the axis of the prismatic joint defines the direction of lift H. If the contact planes passing through the contact points of the driven wheels and transport wheels are aligned with each other when the low-floor transport system is hoisting off the floor perpendicular to the direction of lift, and if the rigidity $C_A$ of the first spring is less than the rigidity $C_T$ of the second spring, then both springs are compressed by the same compression travel when the chassis are set down on a shared, flat contact surface. Due to the greater rigidity $C_T$ of the second spring, the contact force of the transport chassis is then greater than the contact force of the drive chassis for a region of the compression travel, up to a potential full compression of the first spring and/or end halt of the prismatic joint of the drive module, wherein the load is therefore advantageously removed from the drive chassis by the transport chassis. At the same time, the first spring creates a contact force of the drive chassis, and therefore increases the friction thereof required for movement. The example in FIG. 4 demonstrates that the drive force element can therefore advantageously reduce the risk of the driven wheels having too little contact force. It can also be seen that the drive force element can be dispensed with. In this case, in the example shown in FIG. 4, the working load would be supported solely via the second spring and/or the transport module, ignoring the friction in the prismatic joint, the contact force of the driven wheels resulting solely from the force of gravity.

In one embodiment, a rigidity of the drive force element of at least one drive module, and in particular the (individual) rigidities of all drive modules—in each case for at least one region of the compression travel—is smaller than the respective individual rigidities of the transport module(s) connected thereto—in particular the connections thereof of the respective transport chassis to the transport base in the direction of lift. In one embodiment, one individual rigidity of at least one drive force element in this region of the compression travel is at most 75%, and in particular at most 50%, and in particular at most 25% of the individual rigidity of at least one transport module connected thereto, in particular the connection thereof between the base and chassis.

In the present context, a rigidity c in the direction of lift has in particular the conventional use in the field, which is the ratio of an increase $\Delta F$ of a contact force F to a reduction $\Delta a$ of a distance a from the drive chassis and base in the direction of lift and/or a compression travel $\Delta a$ ($c=\Delta F/\Delta a$). As explained above with reference to the example in FIG. 4, the rigidity can change over the compression travel; the force element accordingly has a characteristic curve which is progressive or declining in at least a section thereof. Accordingly, in one embodiment, the rigidity of the drive force element(s) is smaller for at least a region of the compression travel than the rigidity of the connection(s) of the transport chassis and base. If the drive module has no drive force element, this can also be seen as a (virtual) drive force element with a constant rigidity which is equal to zero. A rigidity of a module, in particular its connection of base to chassis, in particular its force element, means in particular the ratio of an increase of a contact force to a reduction of a distance to a contact surface in the direction of lift. It is accordingly possible to determine, in particular empirically by experiments, and/or calculate by simulations, by determining a compression travel and/or a reduction in a distance between base and chassis in the direction of lift, and the associated contact force exerted by the chassis, for various different working loads, and establishing a ratio from these.

In one embodiment, the rigidity/rigidities of the transport module(s), in particular of their connection(s) of transport chassis and base, in particular at the start of the compression travel, can also be smaller than the rigidity/rigidities of the drive force element(s)—in particular equal to zero. If, in the example shown in FIG. 4 and explained above, the driven wheels are positioned above the transport wheels in a line toward the ground, when the low-floor transport system is lifted off the ground, then when the low-floor transport system is set down on the ground, the first spring is first tensioned, and the second accordingly has a spring rigidity $C_T=0$ at the start of the compression travel. As a result, it is possible to advantageously increase a friction of the driven wheels.

Accordingly, in one embodiment, the region of the compression travel for which the rigidity of the drive force element of at least one drive module is less than the rigidity of at least one transport module extends over at least 30%, in particular at least 50%, and/or at most 90%, in particular at most 75% of a maximum actuating travel of the drive force element in the direction of lift. As in the example of the hoisted low-floor transport system with aligned driven wheels and transport wheels, the rigidity of the drive force element(s) can also be smaller over the entire constructively prespecified and/or maximum actuating travel thereof than the rigidity/rigidities of the connection(s) of the transport module.

In one embodiment, each of the drive force elements of one or multiple drive modules has at least one mechanical, pneumatic, and/or hydraulic spring and/or at least one, in particular electrically controllable, actuator. A pneumatic and/or gas (pressure) spring in one embodiment has a gas-filled chamber in which a piston rod is mounted in a manner allowing sliding. The retraction of the piston rod into the chamber compresses the gas and applies a greater reaction force to the end face of the piston rod. A very flat characteristic curve can then be achieved by a corresponding piston rod diameter, such that the pneumatic spring can exert a substantially constant contact force over a large compression travel. A corresponding contact force can alternatively, or in addition thereto, be exerted by an accordingly controlled actuator.

In one embodiment, each transport chassis of one or multiple transport modules is mounted on its respective transport base in a rigid manner inhibiting movement in the direction of lift. In this way, it is advantageously possible to provide a constructively simple and compact transport module, wherein irregularities in the ground surface can be compensated in one embodiment by the compression of the drive chassis.

In one embodiment, each transport chassis of one or multiple transport modules is mounted on its respective transport base in a manner allowing movement in the direction of lift, in particular between a retracted position and an extended position, and in a further implementation is supported elastically in the direction of lift by a transport force element. In one implementation, at least one transport base and the connection to the transport chassis connected thereto, and at least one drive base and the connection to the drive chassis connected thereto are at least substantially identically designed and/or constructed, such that the transport module and drive module (only) differ by the force elements and chassis. In this way, it is advantageously possible to produce and/or assemble either a drive module or transport module with the same base and the—excluding the force element—same connection, using a simple and/or optional assembly of the corresponding force elements and chassis.

In one embodiment, the transport force element of one or multiple transport modules has at least one mechanical spring, in particular a coil spring, disk spring, or leaf spring, and/or a—in particular electrically controllable—actuator. With corresponding spring sizes and material, it is possible to achieve a comparatively steep characteristic curve, such that the mechanical springs exert a relatively high contact force at only a short compression path and the transport module therefore is able to accept a greater fraction of a working load-induced pressure distribution. A corresponding contact force can alternatively, or in addition thereto, be exerted by an accordingly de-energized actuator.

The rigidity of a force element and/or a transport force element in the direction of lift can in particular be varied by a modified linkage, and thereby adapted to different operating and/or design conditions. Accordingly, in one embodiment, each of one or multiple drive modules—in particular the drive base, drive chassis, and/or connection of base to chassis, and in particular the connecting link and/or force element—has two or more articulation points which are included and/or configured for the optionally detachable attachment of the drive force element. In addition or as an alternative thereto, in one embodiment, each of one or multiple transport modules—in particular the transport base, transport chassis, and/or the connection of base to chassis, and in particular the connecting link and/or force element—has two or more articulation points which are included and/or configured for the optionally detachable attachment of the drive force element.

In one embodiment, each of one or multiple of the drive chassis is designed and/or configured for a translational travel movement in a direction of travel, in particular in a forward and/or reverse direction of travel perpendicular to an axis of rotation of one or more of the driven wheels. In addition or as an alternative thereto, in one embodiment, each of the one or more drive chassis is designed and/or configured for a translational travel movement in a lateral and/or leftward and/or rightward direction of travel parallel to the axis of rotation of the driven wheel(s). In addition or as an alternative thereto, in one embodiment, each of the one or more drive chassis is designed and/or configured for a rotational travel movement, in particular a yaw movement perpendicular to the axis of rotation of the driven wheel(s) and/or the forward and/or reverse direction of travel.

For the purpose of realizing a rotational yaw movement and a translational travel movement, coupled thereto, in the forward/reverse—and lateral directions of travel, the drive chassis can in particular have one or multiple steering axles capable of rotation. In one embodiment, each of one or multiple, and in particular all, driven wheels of the drive chassis of one or multiple, and in particular all, drive modules has one or multiple rollers which are mounted in a manner allowing rotation with an inclination with respect to an axis of rotation of the respective driven wheel of in particular at least 30 degrees, and preferably 45 degrees or 90 degrees. In one embodiment, the drive chassis can be a so-called omnidirectional chassis, in particular with Mecanum or omni/poly driven wheels. Likewise, one or multiple drive- and/or transport chassis can also have one or multiple chains, crawlers, or the like which surround the driven- and/or transport wheels.

A rotational yaw movement of the low-floor transport system can also be realized, in one embodiment, by drive modules and/or drive chassis which are differentially driven and/or driven at different translational speeds and are spaced apart from each other perpendicular to the direction of the translational speeds, in particular in the manner of the steering of a tracked vehicle. For this reason, in one implementation, one or more of the drive chassis are in particular only designed for a translational travel movement in one direction of travel.

The mobility of a drive chassis relative to the drive base in the direction of lift can in particular be implemented by a prismatic joint which connects the base and the chassis with articulation and is able to define the axis thereof in the direction of lift. Likewise, it can be implemented by at least two swivel joints with parallel axes of rotation, which are connected to each other in particular via connecting rods. Then, the drive chassis in one embodiment is able to move relative to the drive base on a circular path, and also execute a translational movement in a direction of lift.

Additionally or as an alternative to a translational degree of freedom in the direction of lift, according to one aspect of the invention, the drive chassis, connected to the drive base, of each of one or multiple drive modules has one or two degrees of rotational freedom relative to its respective drive base, wherein the axes of rotation of said degrees of freedom are preferably perpendicular to the direction of lift and/or to each other. In this way, in one embodiment it is possible to also compensate for inclinations of the drive chassis about a pitch- and/or rolling axis perpendicular to the direction of lift, in addition to a compensation in the direction of lift.

In particular for this purpose, in one embodiment, the drive chassis of each of one or more of the drive modules is connected to its respective drive base via one, two, or more swivel joints and/or one, two, or more prismatic joints, wherein in one implementation, axes of these joints are paired into parallel or perpendicular pairs. In one embodiment, the drive chassis and base are connected via two swivel joints and one prismatic joint, which are connected in series proceeding from the base in an arrangement as swivel joint-swivel joint-prismatic joint, swivel joint-prismatic joint-swivel joint, or prismatic joint-swivel joint-swivel joint.

In the same way, in one embodiment, the transport chassis of each of one or more of the transport modules relative to their transport basis can have a translational degree of freedom in the direction of lift and/or one or two rotational degrees of freedom, wherein the axes of rotation thereof are preferably perpendicular to the direction of lift and/or to each other. In particular for this purpose, in one embodiment, the transport chassis of each of one or more of the transport modules is connected to its respective transport base via one, two, or more swivel joints and/or one, two, or more prismatic joints, wherein in one implementation, axes of these joints are paired into parallel or perpendicular pairs. In one embodiment, the transport chassis and base are connected via two swivel joints and one prismatic joint, which are connected in series proceeding from the base in an arrangement as swivel joint-swivel joint-prismatic joint, swivel joint-prismatic joint-swivel joint, or prismatic joint-swivel joint-swivel joint. In addition or as an alternative thereto, a swivel joint can also be arranged between the transport base and the transport chassis, in particular between one or more transport wheels, and can form a rotational degree of freedom about an axis of rotation which is parallel to the direction of lift.

In one embodiment, the drive base and the drive chassis of one or multiple drive modules and/or the transport base and the transport chassis of one or multiple transport modules are connected to each other in a torque-proof manner in and/or with respect to the direction of lift, in particular, and at least substantially, free of rotational play, and in particular torsionally stiff and/or incapable of rotation. In other words, in one embodiment, in the case of one or multiple drive modules, the drive chassis does not have any rotational degree of freedom relative to the drive base in and/or with respect to the direction of lift, and/or has a locked rotational degree of freedom, and/or in the case of one or multiple transport modules, the transport chassis does not have any rotational degree of freedom relative to the transport base in and/or with respect to the direction of lift, and/or has a locked rotational degree of freedom.

In addition or as an alternative thereto, in one embodiment, the drive base and the drive chassis of one or multiple drive modules and/or the transport base and the transport chassis of one or multiple transport modules are each connected to each other in an axially-fixed manner in and/or with respect to one or two transverse directions which are perpendicular to each other and perpendicular to the direction of lift, in particular, and at least substantially, free of axial play, and in particular axially rigid and/or incapable of axial displacement. In other words, in one embodiment, in the case of one or multiple drive modules, the drive chassis does not have any axial degree of freedom relative to the drive base in and/or with respect to the transverse direction(s), and/or has a locked translational and/or axial degree of freedom, and/or in the case of one or multiple transport modules, the transport chassis does not have any translational and/or axial degree of freedom relative to the transport base in and/or with respect to the transverse direction(s), and/or has a locked translational and/or axial degree of freedom.

Bases which are connected to each other can adjoin each other in one embodiment. Accordingly, in one embodiment, each outer contour, in particular the end face, of one or multiple, in particular plate-like, drive or transport bases contacts one outer contour opposite the same, in particular the end face, of one or multiple in particular plate-like transport or drive bases connected thereto. As a result, it is possible to advantageously provide a closed loading surface.

In addition or as an alternative thereto, in one embodiment, bases which are connected to each other, in particular the outer contours thereof which are opposite each other—in particular the end faces—can also be spaced apart from each other, in particular by bars which are preferably beam-like in shape. As a result, it is possible to advantageously provide a large outer size of the loading surface.

In particular, to provide an advantageous loading surface with multiple bases connected to each other, bases in one embodiment have an angular, and in particular equal-sided and/or triangular, rectangular, hexagonal, or octagonal outer contour. In this way, the bases can be joined together like a pie, tiles, and/or a honeycomb.

One aspect of the present invention relates to a drive module described herein for a low-floor transport system described herein, which is made and/or configured for the purpose of connecting to at least one transport module described herein, and in one implementation to at least one further drive module described herein, and in particular has a corresponding coupling.

Accordingly, a further aspect of the present invention relates to a transport module described herein for a low-floor transport system described herein, which is made and/or configured for the purpose of connecting to at least one drive module described herein, and in one implementation to at least one further transport module described herein, and in particular has a corresponding coupling.

A further aspect of the present invention relates to a method for the assembly of a low-floor transport system described herein, wherein in one embodiment, optionally different drive modules described herein and/or drive modules described herein are connected to each other in differing numbers and/or arrangements, and optionally different transport modules described herein and/or transport modules described herein are connected to each other in differing numbers and/or arrangements, in particular in a detachable manner.

BRIEF DESCRIPTION OF THE FIGURES

Additional advantages and features are found in the dependent claims and the exemplary embodiments, wherein, in partially schematic views:

DETAILED DESCRIPTION

Figure 3A:
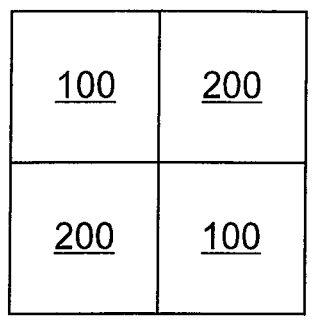
FIG. 3A-3E: shows a top view of a low-floor transport system according to one embodiment of the present invention.

FIG. 3A shows a modular low-floor transport system according to one embodiment of the present invention, in a top view looking down from above onto a transport plane. The low-floor transport system has, by way of example, two drive modules with plate-like drive bases 100 and two transport modules with transport (carrier) bases 200, each having equilateral and rectangular outer contours and being bolted to each other on the end faces thereof which are opposite each other, and/or being bolted to a shared support structure which is not illustrated.

Figure 3B:
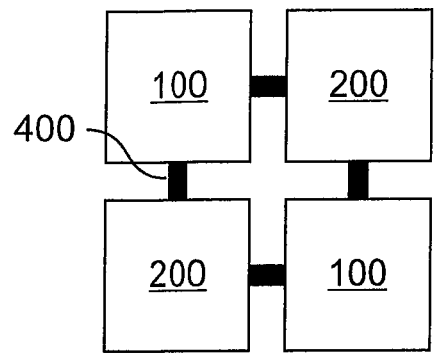

FIG. 3B shows, in a view corresponding to that of FIG. 3A, a modular low-floor transport system according to a further design of the present invention, wherein the drive bases 100 and transport bases 200 are connected to each other with a space between by beam-like bars 400.

Figure 3C:
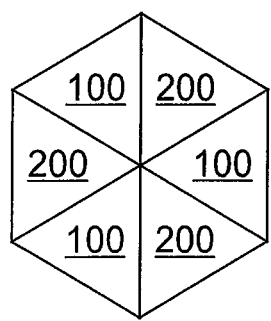

FIG. 3C shows, in a view corresponding to that of FIG. 3A, 3B, a modular low-floor transport system according to a further embodiment of the present invention, wherein the drive bases 100 and transport bases 200 each have equilateral and triangular outer contours and are joined and/or connected to each other like the pieces of a pie, by way of example on the end faces thereof which are opposite each other, and/or are bolted to a shared support structure which is not illustrated.

Figure 3D:
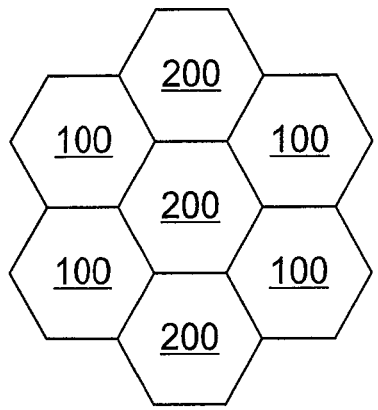

FIG. 3D shows, in a view corresponding to that of FIG. 3A-3C, a modular low-floor transport system according to a further embodiment of the present invention, wherein the drive bases 100 and transport bases 200 each have equilateral and hexagonal outer contours and are joined and/or connected to each other in a honeycomb pattern, by way of example on the end faces thereof which are opposite each other, and/or are bolted to a shared support structure which is not illustrated.

Figure 3E:
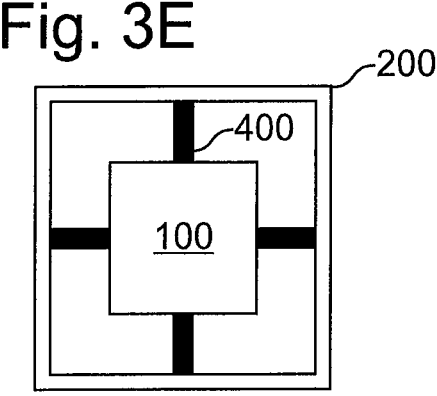

FIG. 3E shows, in a view corresponding to that of FIG. 3A-3D, a modular low-floor transport system according to a further embodiment of the present invention, wherein a central, plate-like drive base 100 is connected to and spaced apart from a concentric, frame-like transport base 200 by bars 400.

Taken together, FIGS. 3A-3E make clear that a selective connection of drive modules and transport (carrier) modules in different numbers and/or arrangements provides a modular low-floor transport system which can very easily, and variably, be modified and in particular extended by exchanging, removing, and/or adding individual modules.

A drive module of identical construction to that of the drive module shown in a top view in FIGS. 3A-3E is described below in greater detail with reference to FIGS. 1A and 1B, wherein the cutaway view in FIG. 1B corresponds to this top view with the drive basis 100 removed; a transport module with a construction which is identical to that shown in FIGS. 3A-3E is described with reference to FIG. 2.

Each drive module has the drive basis 100 named above with reference to FIGS. 3A-3E, and an omnidirectional drive chassis connected thereto, which has four driven Mecanum wheels 101 in this exemplary embodiment, each of which is coupled to the drive (not illustrated) and therefore is designed and/or configured for a translational travel movement in a forward and/or reverse direction of travel (vertically in FIG. 1B) perpendicular to an axis of rotation of the driven wheels, for a translational travel movement in a lateral and/or leftward and/or rightward direction of travel (horizontal in FIG. 1B) parallel to the axis of rotation of the driven wheels, and for a rotational yaw movement perpendicular to the axis of rotation of the driven wheels and to the forward and/or reverse direction of travel.

Each drive module has the transport basis 200 named above with reference to FIGS. 3A-3E, and a transport chassis, with three non-driven transport wheels 201 connected thereto.

Figure 1A:
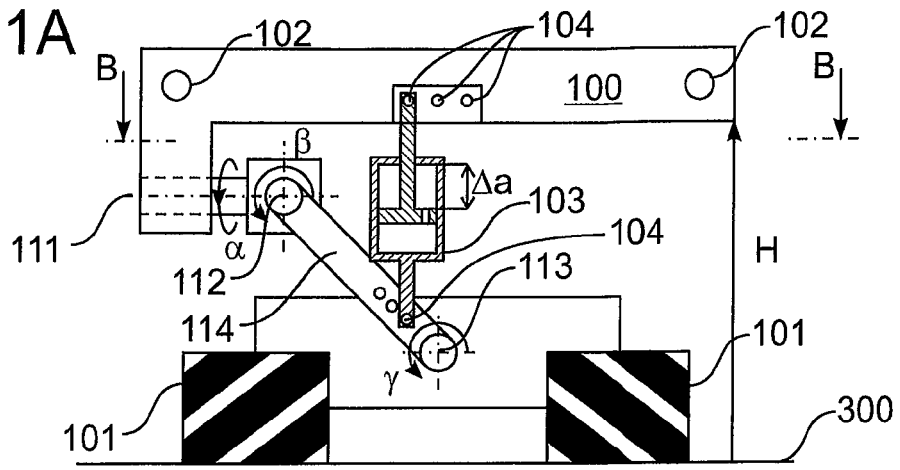
FIG. 1A: shows a drive module of a low-floor transport system according to one embodiment of the present invention, in a front view thereof.
Figure 1B:
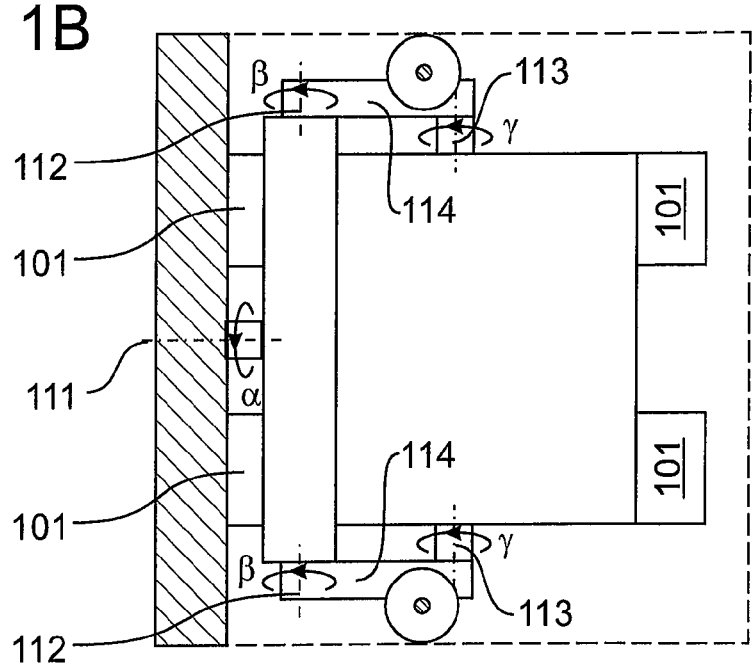
FIG. 1B: shows a cutaway view along the line B-B in FIG. 1A.
Figure 2:
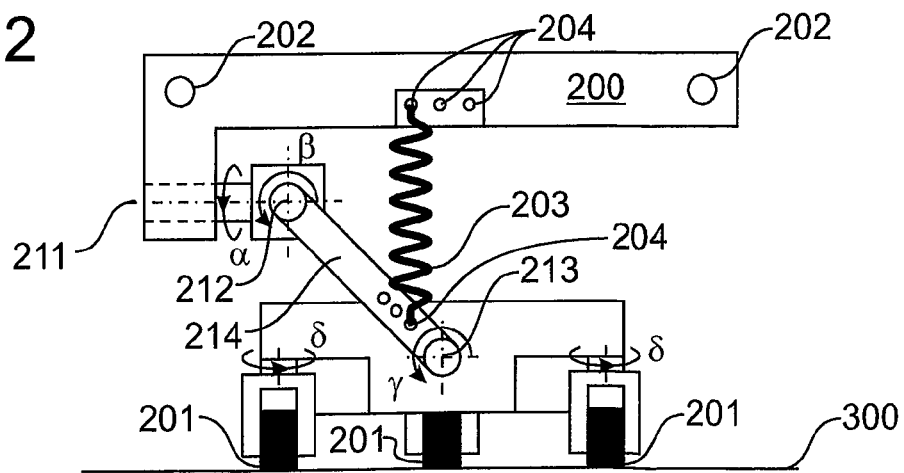
FIG. 2: shows a transport module of the low-floor transport system in FIG. 1A with a corresponding view thereof.

Bore holes 102 and/or 202 are indicated in the front view shown in FIGS. 1A and 2, via which the bases 100, 200 are bolted to each other, thereby forming couplings which are configured to connect the bases 100, 200 to each other in an axially-fixed and torque-proof and/or rigid manner.

The drive chassis 101 is mounted on the drive basis 100 in a manner allowing movement in a direction of lift H between retracted and extended positions which are defined and/or limited by limit stops (not illustrated). For this purpose, in the exemplary embodiment the drive chassis 101 and the drive base 100 are connected to each other in a manner allowing articulation via a first swivel joint 111, which compensates for a pitch angle $\alpha$ of the chassis against the base, two second swivel joints 112 which are aligned with each other, the rotation angles of which are indicated by $\beta$, and two third swivel joints 113, which are aligned with each other, which compensate for a roll angle $\gamma$ of the chassis against the base, wherein the axes of the second and third swivel joints 112, 113 are parallel and perpendicular to the axis of the first swivel joint 111.

The second swivel joints 112, and the third swivel joints 113 connected thereto via connecting rods 114 define the translational mobility and/or a possible compression of the drive chassis 101 in the direction of lift (stroke) H against the drive base 100 in the conventional, known manner using longitudinal control arms. The pitch angle $\alpha$ and roll angle γ form two rotational degrees of freedom, the axes of rotation of which are perpendicular to the direction of lift and to each other.

In the direction of lift, the drive chassis 101 is elastically supported on the drive base 100 by a drive force element in the form of a gas (pressure) spring 103, which is illustrated in a cutaway view in FIG. 1A for simplification. The base-fixed direction of lift H creates an angle of approximately 90 degrees with the transport plane (at top in FIG. 1A) of the bases 100, 200 connected to each other, for the purpose of accepting working loads, and form an angle of approximately 0 degrees with the gravitational vector (from top to bottom in FIG. 1A) when the low-floor transport system is under no load and stationary on a flat, horizontal contact surface 300, as shown in FIG. 1A.

The drive base 100 and connecting rod 114 each have multiple pivot points 104 which are included and/or configured for the purpose of optional detachable attachment of the gas spring 103.

The transport base 200 and transport chassis 201 are connected to each other with the same construction, such that the transport module and drive module only differ by the force elements and chassis. As such, with respect to FIG. 2, attention is hereby directed to the above description, wherein the reference number of corresponding elements in FIG. 2, and/or for the transport module, are greater by 100.

In contrast to the gas spring 103 of the drive module, the transport chassis and the transport basis are supported in the direction of lift by a transport force element in the form of a mechanical spring 203, which has a significantly steeper characteristic curve and/or exerts a significantly greater contact force at the same compression travel in the direction of lift H.

In addition, the non-driven transport wheels 201 have a passive rotational degree of freedom δ above an axis of rotation which is parallel to the direction of lift H.

Figure 4:
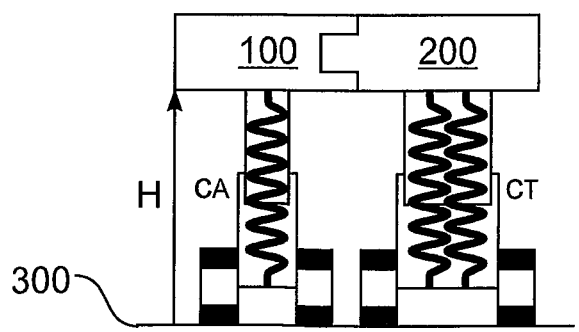
FIG. 4: shows a sketch which explains a low-floor transport system according to one embodiment of the present invention.

The gas and mechanical springs 103, 203 are designed in such a manner that, for a compression travel Δa of the drive chassis 101 against the drive base 100 in the direction of lift H, a contact force of this drive chassis 101 on the shared, flat contact surface 300 is less than a contact force of the transport chassis 201. In the exemplary embodiment, as explained schematically above with reference to FIG. 4, this results from the significantly steeper characteristic curve of the mechanical spring 203: the same exerts a greater contact force on the shared, flat contact surface 300 at the same compression travel in the direction of lift than the gas spring 103, as a result of its greater rigidity, said gas spring 103 providing a nearly constant contact force over a wide range of the maximum possible compression travel, and therefore protecting the driven Mecanum wheels 101 and their drive(s) from excessive loads. On the other hand, this contact force nonetheless provides an advantageous friction for the omnidirectional movement of the drive chassis on the contact surface.

Although exemplary embodiments have been explained in the above description, it is hereby noted that a number of modifications is possible.

As such, in particular in an embodiment which is not illustrated, the transport wheels 201 can also be mounted on the transport base 200 in the direction of lift in rigid manner and/or a manner not allowing movement.

Figure 5:
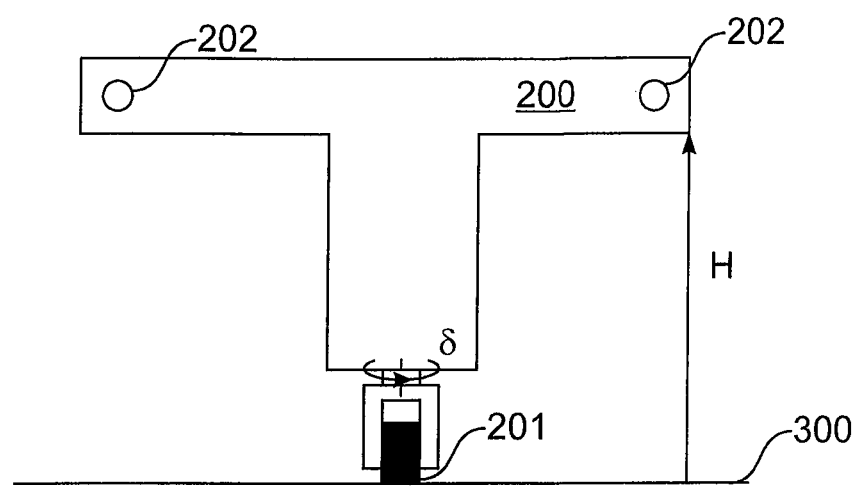
FIG. 5: shows a transport module of a low-floor transport system according to one embodiment of the present invention in a view corresponding to that of FIG. 2.

As such, FIG. 5 shows, in a view corresponding to that of FIG. 2, such a transport module, which can in particular be used in a low-floor transport system in place of a transport module as explained above with reference to FIG. 2, as in particular explained above with reference to FIGS. 3A-3E. Features which correspond to each other are identified by the same reference numbers, such that reference is hereby made to the description for FIG. 2.

In the embodiment of FIG. 5, the single, non-driven transport wheel 201, indicated by the angle δ, is mounted on the transport base 200 by a swivel joint in a manner allowing movement about an axis of rotation which is parallel to the direction of lift H, but is itself connected rigidly to the transport base 200 in the direction of lift.

In addition, it is hereby noted that the exemplary embodiments are merely examples which are not intended to in any way restrict the scope of protection, the uses, and the construction. Rather, the preceding description gives a person skilled in the art a guideline for the implementation of at least one exemplary embodiment, wherein various modifications, in particular with respect to the function and arrangement of the components described, can be undertaken without departing from the scope of protection as indicated by the claims and the equivalent combinations of features.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

List of Reference Numbers 100 drive base
101 driven (Mecanum) wheel (drive chassis)
102 bore hole (coupling)
103 gas spring (drive force element)
104 pivot point
111 first swivel joint ($\alpha$)
112 second swivel joint ($\beta$)
113 third swivel joint ($\gamma$)
114 connecting rod
200 transport base
201 transport wheel (transport chassis)
202 bore hole (coupling)
203 coil spring (transport force element)
204 pivot point
211 first swivel joint ($\alpha$)
212 second swivel joint ($\beta$)
213 third swivel joint ($\gamma$)
214 connecting rod
300 contact surface
400 bar
H direction of lift
Δa compression travel
$C_A$, $C_T$ spring rigidity

What is claimed is:
1. A modular low-floor transport system, comprising:
 at least one drive module, the drive module comprising:
  a drive base, and
  a drive chassis connected with the drive base, the drive chassis including at least one drive wheel that is coupled with a drive; and at least one carrier module, the carrier module comprising:
- a carrier base, and
- a carrier chassis connected with the carrier base, the carrier chassis including at least one driveless carrier wheel;

wherein the drive base and the carrier base are rigidly connected to each other with respect to a stroke direction; and wherein the drive chassis is movably mounted in the stroke direction to the drive base.

2. The modular low-floor transport system of claim 1, wherein the drive chassis comprises one or two rotational degrees of freedom relative to the drive base.

3. The modular low-floor transport system of claim 1, wherein the drive chassis is resiliently supported in the stroke direction by a drive force element.

4. The modular low-floor transport system of claim 3, wherein the drive force element is adapted in such a way that a contact force of the drive chassis on a common planar contact area perpendicular to the stroke direction is smaller than a contact force of the carrier chassis for at least a portion of a jounce travel of the drive chassis against the drive base in the stroke direction.

5. The modular low-floor transport system of claim 4, wherein for at least a portion of the jounce travel, a stiffness of the drive force element is less than a stiffness of the carrier module in the stroke direction.

6. The modular low-floor transport system of claim 3, wherein the drive force element comprises at least one of:
- a spring, wherein the spring is at least one of a mechanical, pneumatic, or hydraulic spring; or
- an actuator.

7. The modular low-floor transport system of claim 1, wherein the carrier chassis is movably mounted to the carrier base in the stroke direction, and resiliently supported by a carrier force element.

8. The modular low-floor transport system of claim 7, wherein the carrier force element comprises at least one of a mechanical spring or an actuator.

9. The modular low-floor transport system of claim 3, wherein at least one of the drive module or the carrier module comprises at least two pivot points configured for selectively removably attaching at least one of the drive force element or the carrier force element.

10. The modular low-floor transport system of claim 1, wherein the drive chassis is adapted for a translational travel in at least one direction of travel and/or for a rotary travel.

11. The modular low-floor transport system of claim 10, wherein at least one drive wheel of the drive chassis comprises rollers that are rotatably mounted such that axes of rotation of the rollers are inclined towards an axis of rotation of the drive wheel.

12. The modular low-floor transport system of claim 1, wherein the drive chassis is connected to the drive base and/or the carrier chassis is connected to the carrier base via at least one swivel joint and/or at least one sliding joint.

13. The modular low-floor transport system of claim 1, wherein an outer contour of the drive base and an opposing outer contour of the connected carrier base are in contact with each other or are spaced apart from each other.

14. The modular low-floor transport system of claim 1, wherein at least one of the drive base or the carrier base comprises an angular shaped outer contour.

15. A drive module for a low-floor transport system, the drive module comprising:
- a drive base, the drive base configured to be rigidly connected to a carrier base of the low-floor transport system with respect to a stroke direction; and
- a drive chassis connected with the drive base, the drive chassis including at least one drive wheel that is coupled with a drive;

wherein the drive chassis is movably mounted in the stroke direction to the drive base.

16. A carrier module for a low-floor transport system, the carrier module comprising:
- a carrier base, the carrier base configured to be rigidly connected to a drive base of the low-floor transport system with respect to a stroke direction; and
- a carrier chassis connected with the carrier base, the carrier chassis including at least one driveless carrier wheel.

17. A method of assembling a low-floor transport system having a plurality of drive modules and a plurality of carrier modules, each drive module comprising a drive base and a drive chassis connected with the drive base, the drive chassis including at least one drive wheel that is coupled with a drive, each carrier module comprising a carrier base and a carrier chassis connected with the carrier base, the carrier chassis including at least one driveless carrier wheel, the method comprising:
- selectively connecting at least one drive module with at least one carrier module such that the drive base and the carrier base are rigidly connected to each other with respect to a stroke direction;
- the drive chassis being movably mounted in the stroke direction to the drive base.

18. The modular low-floor transport system of claim 2, wherein the axes of rotation of the rotational degrees of freedom are perpendicular to at least one of the stroke direction or to each other.

19. The modular low-floor transport system of claim 6, wherein the drive force element comprises and actuator that is electronically controllable.

20. The modular low-floor transport system of claim 8, wherein the carrier force element comprises and actuator that is electronically controllable.

21. The modular low-floor transport system of claim 13, wherein at least one of the drive base or carrier base is plate-like in form.

22. The modular low-floor transport system of claim 14, wherein the angular shaped outer contour is triangular, rectangular, hexagonal, or octagonal.

23. The method of claim 17, wherein selectively the drive module with the carrier module comprises selectively removably connecting the drive module with the carrier module.

* * * * *

UNITED STATES PATENT AND TRADEMARK OFFICE
CERTIFICATE OF CORRECTION

| | |
|---|---|
| PATENT NO. | : 9,623,923 B2 |
| APPLICATION NO. | : 14/833203 |
| DATED | : April 18, 2017 |
| INVENTOR(S) | : Martin Riedel et al. |

It is certified that error appears in the above-identified patent and that said Letters Patent is hereby corrected as shown below:

In the Specification

Column 9, Lines 53-54, read "FIG. 3C shows, in a view corresponding to that of FIG. 3A, 3B, a modular low-floor" and should read -- FIG. 3C shows, in a view corresponding to that of FIGS. 3A, 3B, a modular low-floor --.

Column 9, Lines 62-63, read "FIG. 3D shows, in a view corresponding to that of FIG. 3A-3C, a modular low-floor" and should read -- FIG. 3D shows, in a view corresponding to that of FIGS. 3A-3C, a modular low-floor --.

Column 10, Lines 4-5, read "FIG. 3E shows, in a view corresponding to that of FIG. 3A-3CD a modular low-floor" and should read -- FIG. 3E shows, in a view corresponding to that of FIGS. 3A-3D, a modular low-floor --.

Column 10, Line 21, reads "to this top view with the drive basis 100 removed" and should read -- to this top view with the drive bases 100 removed --.

Column 10, Line 24, reads "Each drive module has the drive basis 100 named above" and should read -- Each drive module has the drive bases 100 named above --.

Column 10, Line 38, reads "Each drive module has the transport basis 200 named above" and should read -- Each drive module has the transport bases 200 named above --.

Column 10, Line 47, reads "The drive chassis 101 is mounted on the drive basis 100" and should read -- Each drive chassis 101 is mounted on the drive base 100 --.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,623,923 B2

In the Claims

Claim 19
Column 14, Line 44, reads "wherein the drive force element comprises and actuator" and should read "wherein the drive force element comprises an actuator --.

Claim 20
Column 14, Line 47, reads "wherein the carrier force element comprises and actuator" and should read -- wherein the carrier force element comprises an actuator --.

Claim 23
Column 14, Lines 55-56, read "The method of claim 17, wherein selectively the drive module with the carrier module comprises selectively" and should read "The method of claim 17, wherein selectively connecting the drive module with the carrier module comprises selectively --.